Patented June 17, 1941

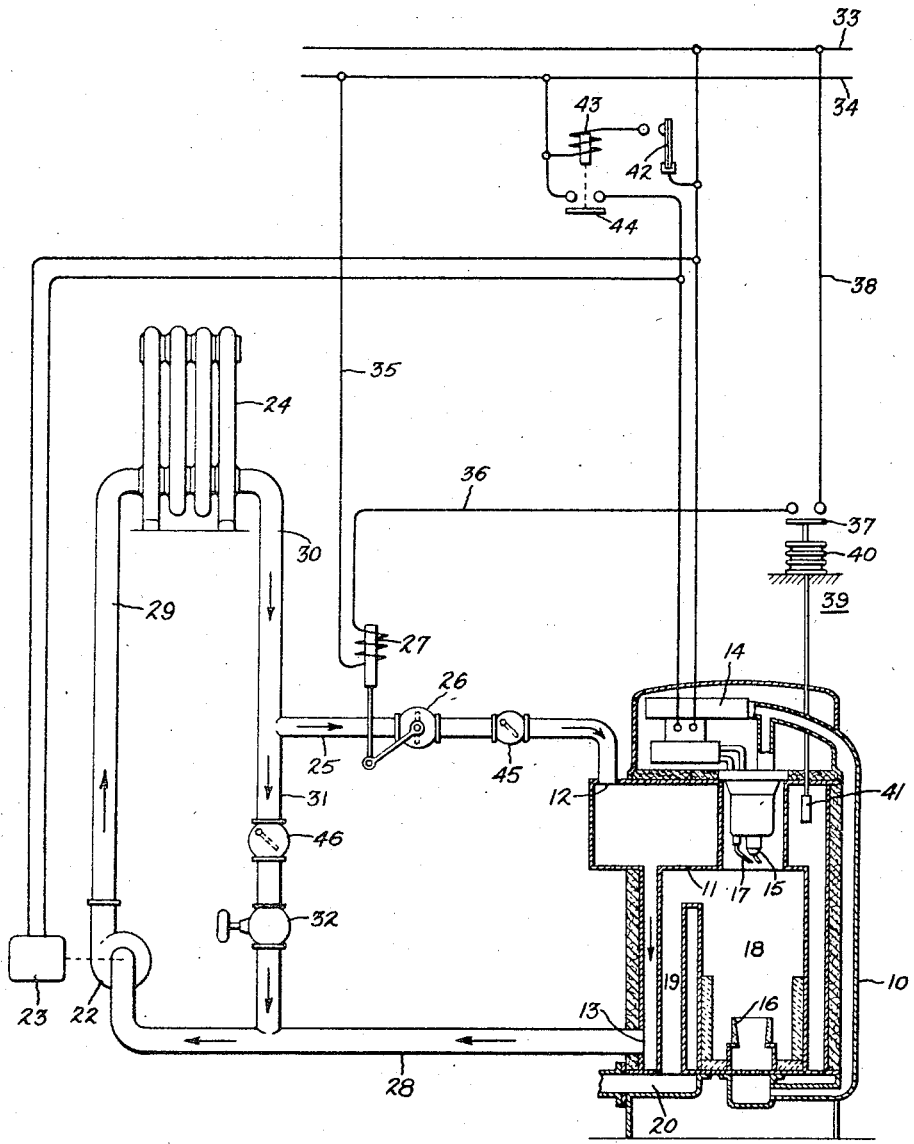

2,246,138

UNITED STATES PATENT OFFICE 2,246,138

HEATING SYSTEM

Walter O. Lum, West Orange, N. J., assignor to General Electric Company, a corporation of New York Application July 31, 1940, Serial No. 348,947

1 Claim. (Cl. 237—8)

My invention relates to a control for a heating system and more particularly to a control for a heating system of the type in which the heating transfer fluid is heated in a furnace and circulated through a heat transfer device located in the zone to be heated thereby.

In heating systems of the type referred to above it is common to use a furnace provided with a heat transfer fluid receptacle in heat conducting relation with a combustion chamber. The products of combustion passing through the combustion chamber resulting from the combustion of many fuels such as coal and oil are corrosive if they are cooled to a point (dew point) where they condense. Thus it has been found at times, when the demand on the heating system is considerably below the maximum for which the system is designed, the temperature of the heat transfer fluid circulated through the furnace receptacle and the resultant temperature of the wall of the combustion chamber and the gas passages runs considerably below the dew point of the products of combustion. This causes condensation of products of combustion on the combustion chamber and gas passage walls thereby causing serious damage from corrosion.

It is an object of my invention to provide a heating system of the type described with an automatically controlled protective device adapted to prevent the occurrence of conditions likely to cause condensation of the products of combustion and the resultant corrosion of the combustion chamber and gas passage walls.

It is a further object of my invention to provide an automatic control for accomplishing this result which is simple in construction, positive in operation, and has a minimum of working parts.

My invention will be better understood from the following description taken in connection with the accompanying drawing in which the single figure illustrates a heating system embodying my invention.

Referring to the drawing I have shown, for the purposes of illustration, a furnace 10 of the oil burning type provided with a heat transfer fluid receptacle or drum 11 having inlet 12 and an outlet 13. The furnace 10 is provided with suitable electric burner motor and control apparatus 14 for supplying oil together with high pressure atomizing air to the burner and low pressure combustion air to the lower air box 16. Suitable means including spark electrode 17 are provided for igniting the atomized oil to start combustion in the furnace. During operation the hot products of combustion pass from the combustion chamber 18 through the passage 19 to the flue connection 20. The walls of the combustion chamber 18 are in heat conducting relation with the heat transfer fluid in drum 11 and, as shown, the walls of chamber 18 and drum 11 may comprise a common structural element. Thus it will be understood that the temperature of the walls of the combustion chamber 18 is dependent on the temperature of the heat transfer fluid in drum 11.

For the purpose of circulating heat transfer fluid from the drum 11 of the furnace 10 to the heat transfer device 24, I have shown a pump 22 driven by a suitable motor 23. The inlet conduit 25 leading to the inlet 12 of the heating drum 11 is provided with a normally closed valve 26 controlled by a suitable motor such as a solenoid 27. The outlet conduit 28 connects the outlet 13 of the heating drum 11 to the intake of the circulating pump 22. Heat transfer fluid discharged from the pump 22 passes to the heat transfer device 24 through the conduit 29 and leaves through the conduit 30 which connects with inlet conduit 25. In the preferred embodiment I have shown a by-pass conduit 31 connected in parallel with a heating drum 11 between the inlet conduit 25 and outlet conduit 28. While the conduit 31 is not necessary to the operation of my invention it enables the pump 22 to circulate heat transfer fluid through the heat transfer device 24 even though the valve 26 is in the closed position. By virtue of this bypass arrangement, the heat residing in the heat transfer fluid in the system may be imparted to the heat transfer device 24 by circulation of the heat transfer fluid therethrough even though the inlet valve 26 to the furnace is in the closed position precluding circulation of fluid through the furnace. Also in actual practice a plurality of heat transfer devices connected in parallel are used and the bypass permits sufficient continuous circulation through the system to insure an even distribution of heated fluid and lessens the tendency of the heated fluid to "short circuit" through the nearest radiator particularly during starting conditions.

In order to provide sufficient pressure differential to force heat transfer fluid through the inlet 25 when valve 26 is open it is necessary to provide a suitable resistance to fluid flow in the conduit 31. I have illustrated an adjustable gate valve 32 in conduit 31 for accomplishing this purpose. It is obvious, however, that any other form of variable or fixed resistance might be used. Check valves 45 and 46, located in conduits 25 and 31 respectively, and opening in the direction of normal fluid flow caused by pump 23, are provided to prevent thermosiphon circulation when the pump is not running and the furnace temperature is such as to open valve 26 in a manner described below.

One side of the solenoid 27, which controls the operation of the inlet valve 26, is connected to the supply line 34 through the line 35. The other side of the solenoid is connected to the supply line 33 through the line 36, the switch 37, and line 38. The switch 37 is controlled by any suitable thermostat 39 responsive to the temperature of the fluid in drum 11. I have shown the thermostat 39 as comprising an expansible bellows member 40 connected to thermostatic bulb 41 located in contact with the heat transfer fluid in the drum 11. The thermostatically operated switch 37 is set to close when the temperature of the fluid in the heating drum rises above a predetermined value. This predetermined value is the highest temperature of the fluid in the heating drum which results in condensation of the products of combustion in the chamber 18. When switch 37 closes solenoid 27 is energized opening valve 26 thereby permitting a flow of heat transfer fluid from the system through the drum 11. The temperature responsive element 39 may be arranged to operate the valve 26 directly. In this arrangement a modulated control of the valve is obtained and the flow of fluid through the furnace inlet is decreased until the temperature of the fluid in the heating drum rises to the predetermined value.

The electrically operated burner motor and control apparatus 14 of furnace 10 and the pump motor 23 are energized from the supply lines 33, 34 through a switch 44 controlled by a solenoid 43. Solenoid 43 is in turn controlled by a control switch which may be a thermostat 42 located in a zone heated by the heat transfer device 24.

In operation when thermostat 42 closes its contacts calling for heat solenoid 43 is energized and closes switch 44 which in turn energizes the burner motor and control apparatus 14 and the pump motor 23. Combustion then takes place in the chamber 18 of the furnace 10 and the pump 22 starts circulating heat transfer fluid through the system. If the temperature of the heat transfer fluid in the heating drum 11 is below a predetermined value, that is, below the highest temperature which results in condensation of the corrosive products of combustion, the thermostatically operated switch 37 will be open and valve 26 will be closed. The heat transfer fluid circulated by the pump 22 through the heat transfer device 24 will then be shunted through the by-pass 31 and no fluid will be circulated through the furnace drum 11. When the temperature of the fluid in the furnace drum rises to the predetermined value, switch 37 will close and the motor valve 26 will open to permit fluid to be circulated from the system through the furnace drum 11 whereupon the furnace delivers heated fluid to the heat transfer device 24. If the temperature of the heat transfer fluid circulating through the system is low enough to reduce the temperature of the fluid in drum 11 below the predetermined value, the motor operated valve 26 will again close and reopen only when the temperature of the fluid in drum 11 again reaches the predetermined minimum.

Thus it is seen that the thermostatically controlled valve 26 acts to prevent the heat transfer fluid normally circulating through the furnace drum 11 during operation from reducing the drum temperature to a point where the corrosive products of combustion will condense on the combustion chamber and furnace walls causing corrosion of the same since, pointed out above, the temperature of the combustion chamber wall is dependent upon the temperature of the heat transfer fluid in the drum or receptacle 11.

My invention may also be applied to a system in which the circulation of the heat transfer fluid is accomplished by thermo-siphon action. In such a system, the pump 22 and the check valves 45 and 46 are omitted.

While I have shown and described a particular embodiment of my invention, it will become apparent to those skilled in the art that my invention has other applications. I, therefore, aim to cover in the appended claim all such modifications and changes.

What I claim as new and desire to secure by Letters Patent of the United States, is:

In a heating system, a furnace provided with a combustion chamber and a receptacle for heat transfer fluid in heat conducting relation therewith, a fuel burner associated with said combustion chamber, inlet and outlet conduits connected to said receptacle, heat transfer means, means for normally causing heat transfer fluid to circulate through a fluid circuit including said outlet conduit, said heat transfer means, said inlet conduit, and said receptacle, a by-pass connecting said inlet and outlet conduits and arranged to shunt a portion of the fluid circuit including said receptacle, said by-pass having sufficient resistance to fluid flow therethrough so that a substantial portion of the circulating fluid normally flows through the portion of the fluid circuit including said receptacle, a valve in said inlet conduit between said receptacle and said by-pass, and means responsive to the temperature of the heat transfer fluid in said receptacle for controlling said valve, said last mentioned means functioning to close said valve and shunt heat transfer fluid around said receptacle through said by-pass when the temperature of the heat transfer fluid in said receptacle decreases to a value which results in condensation of the products of combustion given off by said fuel burner.

WALTER O. LUM.